(12) United States Patent
Nilsson et al.

(10) Patent No.: US 8,708,123 B2
(45) Date of Patent: Apr. 29, 2014

(54) HYDRAULIC PUMP ASSEMBLY

(75) Inventors: Johan Nilsson, Helsingborg (SE); Daniel Herven, Malmo (SE); Peter Dahlstrom, Landskrona (SE); Lars Severinsson, Hishult (SE)

(73) Assignee: BorgWarner TorqTransfer Systems AB, Landskrona (SE)

( * ) Notice: Subject to any disclaimer, the term of this patent is extended or adjusted under 35 U.S.C. 154(b) by 63 days.

(21) Appl. No.: 13/500,518

(22) PCT Filed: Oct. 5, 2010

(86) PCT No.: PCT/SE2010/051070
§ 371 (c)(1),
(2), (4) Date: Jun. 19, 2012

(87) PCT Pub. No.: WO2011/043722
PCT Pub. Date: Apr. 14, 2011

(65) Prior Publication Data
US 2012/0244023 A1 Sep. 27, 2012

(30) Foreign Application Priority Data
Oct. 6, 2009 (SE) ........................................ 0950735

(51) Int. Cl.
*F16D 48/06* (2006.01)
*B60K 23/08* (2006.01)
(52) U.S. Cl.
USPC ................................. 192/85.63; 192/103 FA
(58) Field of Classification Search
CPC ................ B60K 2023/0858; F16D 2048/0245
USPC ........................................................ 475/101
See application file for complete search history.

(56) References Cited

U.S. PATENT DOCUMENTS

| 8,123,016 B2 * | 2/2012 | Lundstrom ................ 192/85.63 |
| 2002/0078792 A1 | 6/2002 | Kobayashi |

(Continued)

FOREIGN PATENT DOCUMENTS

| EP | 1795391 | 6/2007 |
| GB | 783619 | 9/1957 |

(Continued)

OTHER PUBLICATIONS

International Search Report, International Application no. PCT/SE2010/051070, Date of Completion of International Search Dec. 2, 2010, 4 pages.

(Continued)

*Primary Examiner* — David D Le
*Assistant Examiner* — Mark Manley
(74) *Attorney, Agent, or Firm* — BrooksGroup (57) ABSTRACT

One embodiment may include a system for distributing torque between front and rear axles of an all wheel drive vehicle and/or between left and right wheels of a two or four wheel drive vehicle comprises at least one limited slip coupling having a disc package and a piston acting thereon, the piston being actuated by a hydraulic pump assembly. This assembly has an electric motor, a hydraulic pump driven thereby, and a centrifugal regulator also driven thereby, the centrifugal regulator controlling a pressure overflow valve, connected to the oil outlet of the hydraulic pump. The assembly specifically comprises an axial piston pump having a piston drum rotatable in a pump housing and containing a number of reciprocable axial pistons, at least one centrifugal lever pivotally attached to the piston drum, and a valve member connected to the centrifugal lever and being arranged for cooperation with the mouth of an oil outlet bore in the piston drum to form the pressure overflow valve.

9 Claims, 6 Drawing Sheets

(56) References Cited

U.S. PATENT DOCUMENTS

2002/0162722 A1 11/2002 Suzuki et al.
2009/0095149 A1 4/2009 Bergmann

FOREIGN PATENT DOCUMENTS

| JP | S62119560 | 5/1987 |
| JP | H02290735 | 11/1990 |
| JP | 2001354043 | 12/2001 |
| SU | 978644 | 2/1995 |
| WO | 2010019094 | 2/2010 |

OTHER PUBLICATIONS

Japanese Office Action dated Feb. 18, 2014; Applicant: Strom and Gulliksson AB; Application No. 2012-533116; 1 page.

* cited by examiner

Fig 10

US 8,708,123 B2

HYDRAULIC PUMP ASSEMBLY

This application claims the benefit of Swedish Application No. 0950735-1 filed Oct. 6, 2009 and PCT Application No. SE2010/051070 filed Oct. 5, 2010.

TECHNICAL FIELD

The technical field relates to a hydraulic pump assembly in a system for distributing torque between front and rear axles of an all wheel drive vehicle and/or between left and right wheels of a two or four wheel drive vehicle, the system comprising at least one limited slip coupling having a disc package and a piston acting thereon, the piston being actuated by the hydraulic pump assembly, wherein the hydraulic pump assembly comprises an electric motor, a hydraulic pump driven thereby, and a centrifugal regulator also driven thereby, the centrifugal regulator controlling a pressure overflow valve, connected to the oil outlet of the hydraulic pump.

BACKGROUND OF THE INVENTION

A hydraulic pump assembly of the type referred to above is disclosed in WO 2010/019094 (corresponding to copending Swedish Patent Application No 0801794-9 from the same applicant). The objects of the assembly shown therein are in principle the same as for the present invention, namely to reduce the number of components, to simplify the assembly, to reduce the weight and the space requirement for the assembly, and to keep the production and assembly costs as low as possible. Further, there is a desire to create a simple but highly reliable actuation system for a limited slip coupling in a torque distribution system for example for all wheel drive vehicles having the shortest possible reaction time for control signals.

The said application represented a first development stage for a greatly improved assembly, but development work has continued resulting in a truly integrated assembly even better fulfilling the above objects than the previous assembly.

SUMMARY OF ILLUSTRATIVE EMBODIMENTS

For fulfilling the above and other objects the hydraulic pump assembly according to the invention comprises an axial piston pump having a piston drum rotatable in a pump housing and containing a number of reciprocable axial pistons, at least one centrifugal lever pivotally attached to the piston drum, and a valve member connected to the centrifugal lever and being arranged for cooperation with the mouth of an oil outlet bore in the piston drum to form the pressure overflow valve.

An important aspect of the present invention is the integration of the centrifugal lever and the overflow valve with the piston drum.

In a practical embodiment, a number of centrifugal levers—preferably three levers—are evenly distributed around the piston drum, each lever being provided with a ball for engagement with the bore in the piston drum under the action of the centrifugal force.

Spring means are preferably provided for biasing the centrifugal levers in the direction opposite the centrifugal force. In practice, a ring spring may be arranged around the piston drum and the centrifugal levers.

The ball may preferably be connected to its centrifugal lever by means of a spring clip allowing certain position adjustments for the ball in relation to the bore.

Means may be provided for calibrating the assembly occasionally during operation by utilizing the function I=f(U), because a pressure curve in an I/U-graph shows two distinct calibration points or elbows.

BRIEF DESCRIPTION OF THE DRAWINGS

The invention will be described in further detail below under reference to the accompanying drawings, in which.

DETAILED DESCRIPTION

Five general examples of different drive systems for vehicles, normally cars, are shown in FIGS. 1-5. In all examples the vehicle is driven by means of an engine 1 and a transmission 2. The vehicle of all examples has a front axle 3, a rear axle 5, one or more differentials 1, and one or more limited slip couplings 7. A limited slip coupling may be used as a means for distribution of torque between the front and rear axles of an all wheel drive vehicle and/or distribution of torque between left and right wheels of a two or four wheel drive vehicle.

Figure 6:
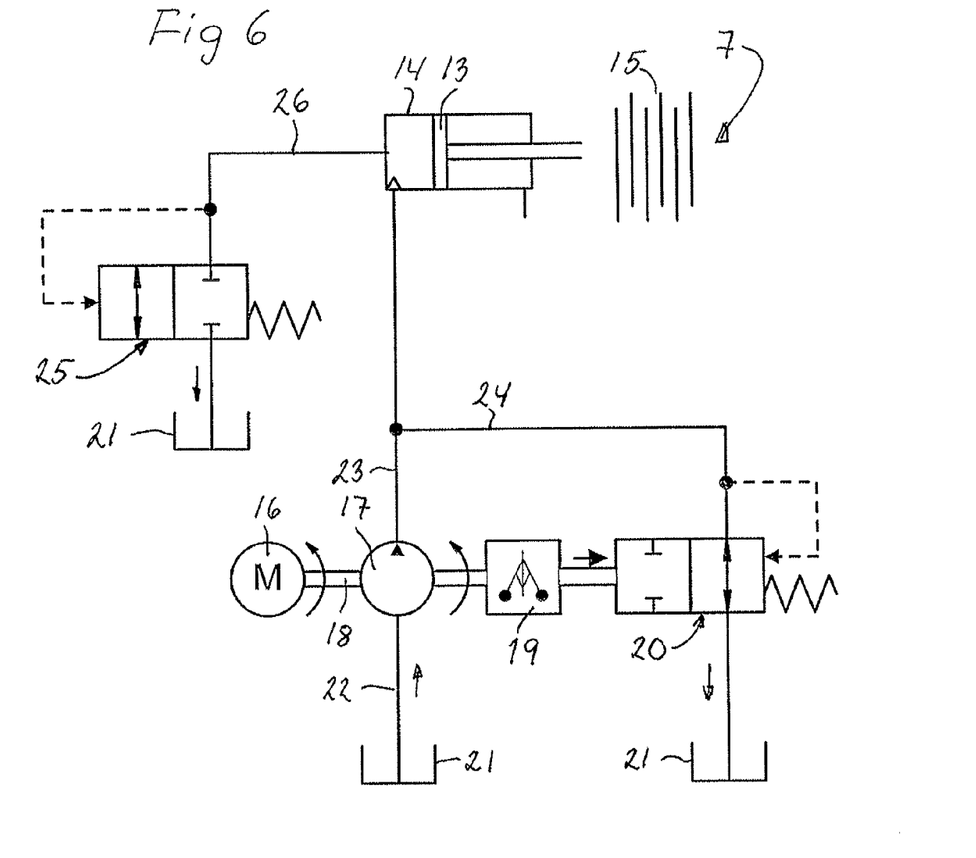
FIG. 6 is a hydraulic scheme of a hydraulic actuator system, in which a hydraulic pump assembly according to the invention is included.

The limited slip coupling 7 comprises, as is schematically illustrated in FIG. 6, a disc package 15 is actuated by means of a piston 13 received in a cylinder 14. When the piston 13 is actuated by means of hydraulic pressure, the discs of the disc package 15 will get into contact with each other and establish driving contact between the two shafts to which they are connected.

Figure 1:
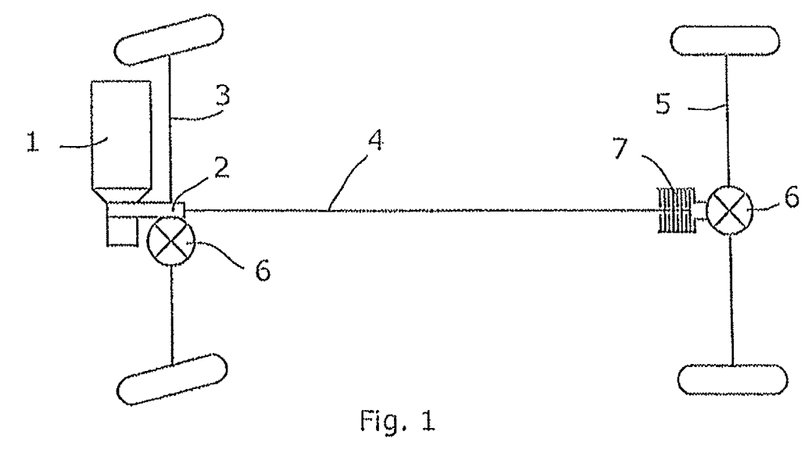
FIGS. 1-5 show outlines of different drive systems for vehicles with limited slip couplings.
Figure 2:
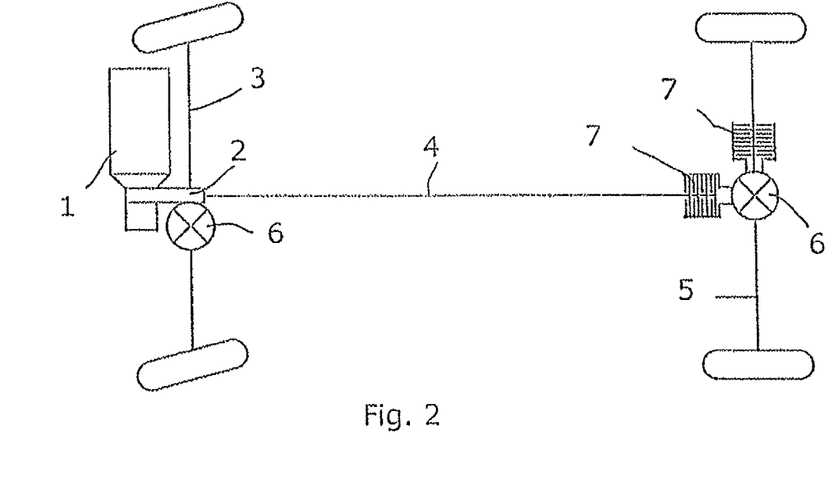
Figure 3:
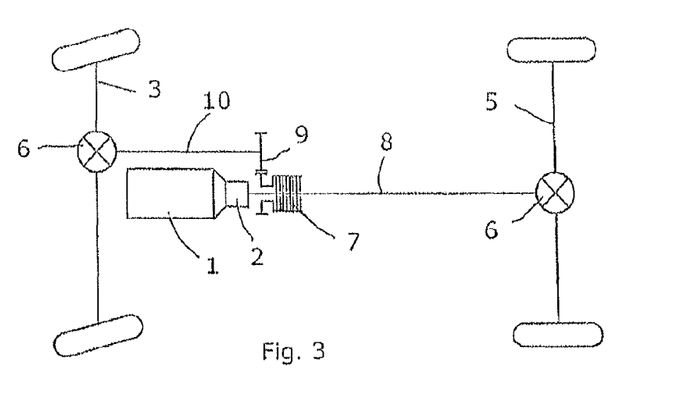
Figure 4:
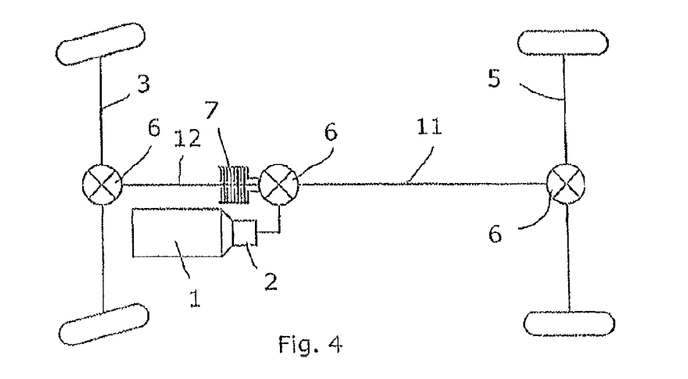
Figure 5:
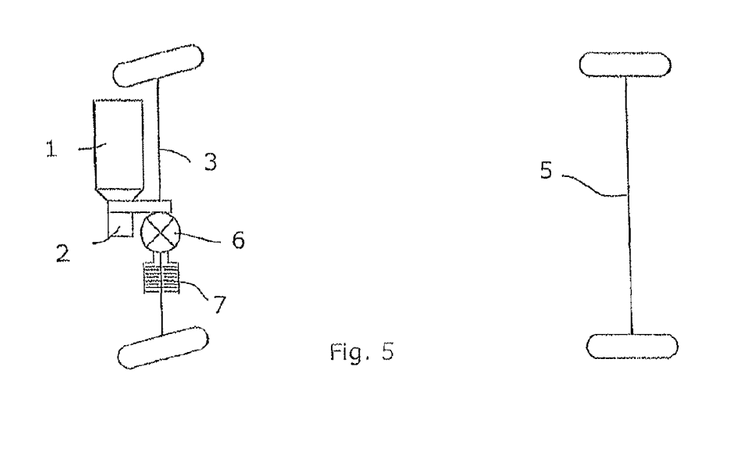

FIG. 1 shows an example of a common four wheel drive, and the example of FIG. 2 has the added possibility to distribute torque between the rear wheels. FIG. 3 illustrates a rear wheel drive with the possibility also to drive the front wheels. In FIG. 4 an example of a vehicle with a central differential is illustrated. Finally, FIG. 5 illustrates an example of a front wheel drive with distribution of torque between the front wheels. A person skilled in the art realizes that there are further examples of drive systems where the present invention, concerned with the control of the limited slip coupling 7, may be used.

In the example of FIG. 1 an intermediate axle 4 is connected between the front axle 3 and the rear axle 5. A limited slip coupling 7 is placed between the intermediate axle 4 and a differential 6 of the rear axle 5. The example of FIG. 2 differs from the example of FIG. 1 only in that a further limited slip coupling 7 is placed on the rear axle 5.

In the example of FIG. 3 a limited slip coupling 7 is placed between the transmission 2 on the engine 1 and an intermediate axle 8, the other end of which is connected to a differential 6 of the rear axle 5. A transmission 9 is placed between the limited slip coupling 7 and a further intermediate axle 10, the other end of which is connected to a differential 6 of the front axle 3.

In the example of FIG. 4 the transmission 2 on the engine 1 is connected to a differential 6, which is connected to a first intermediate axle 11 and a second intermediate axle 12. A limited slip coupling 7 connects the differential 6 with the second intermediate axle 12. The other end of the first intermediate axle 11 is connected to a differential 6 of the rear axle 5. One end of the second intermediate axle 12 is connected to a differential of the front axle 3.

In the example of FIG. 5 a differential 6 is connected to the front axle 3. The differential 6 is connected to two axle halves forming the front axle 3. A limited slip coupling 7 is arranged to connect the differential 6 with one of the axle halves of the front axle 3. In this example the rear axle 5 is not driven.

FIG. 6 is a hydraulic scheme of a hydraulic actuator system, in which a hydraulic pump assembly according to the invention is included.

The system includes an electric motor 16, driving a pump 17 via a drive shaft 18, which also drives a centrifugal regulator 19. The position of the centrifugal regulator 19 controls the position of and flow through a pressure overflow valve 20.

Hydraulic oil for the hydraulic actuator system is contained in a reservoir 21. It is sucked into the pump 17 through a hydraulic line 22 and is delivered therefrom towards the cylinder 14 through a hydraulic line 23. Depending on the position of the centrifugal regulator 19 and thus the pressure overflow valve 20, a portion and sometimes all of the hydraulic flow is diverted through a hydraulic line 24, through the overflow valve 20 and back to the reservoir 21. The result is that the hydraulic pressure delivered to the cylinder 14 is governed by the centrifugal regulator 19.

A relief valve 25 is connected to the cylinder 14 by means of a hydraulic line 26. The relief valve 25 has the purpose of diverting hydraulic oil from the cylinder 14 to the reservoir 21, when its pressure exceeds a certain level, for example 40 bar.

Figure 7:
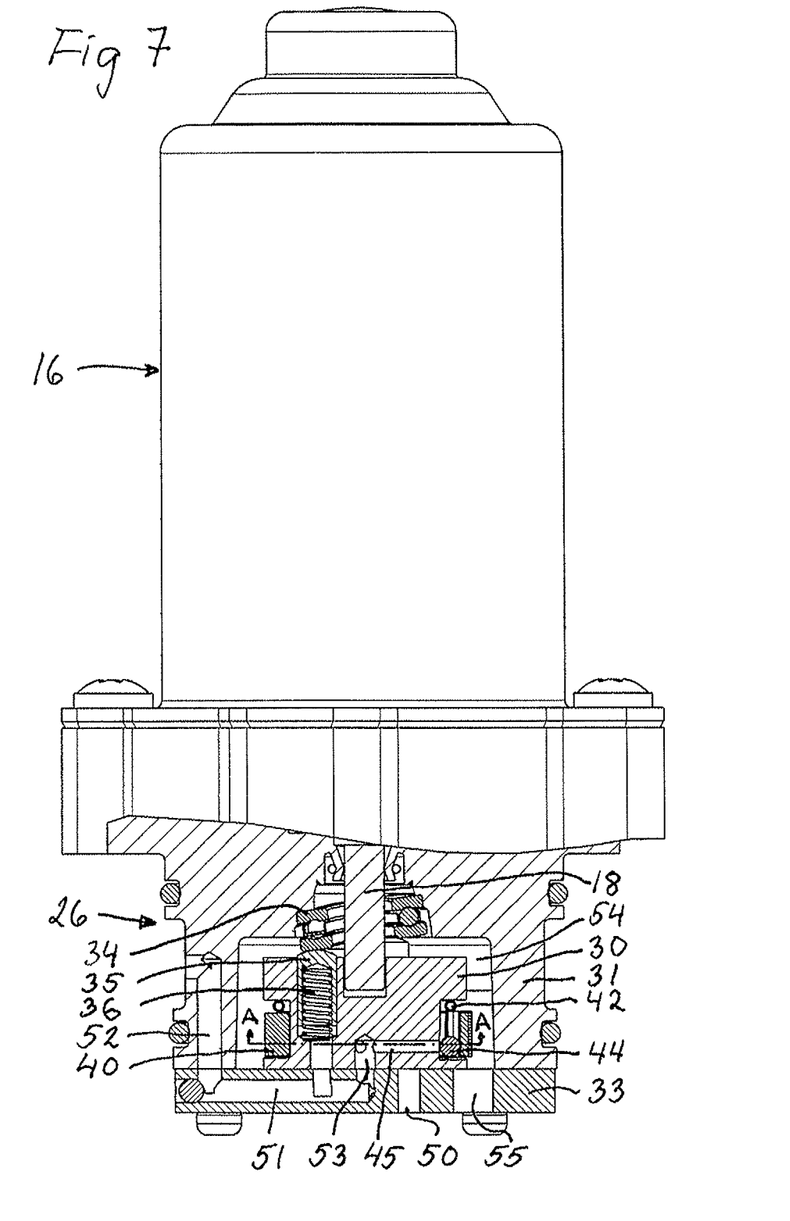
FIG. 7 is a side view, partly in section, of a hydraulic pump assembly according to the invention.

FIG. 7 is an overall side view of a hydraulic pump assembly according to the invention with certain important portions shown in section. Generally, it comprises the electric motor 16 and a pump and valve unit 26 to be described in more detail below. However, it may already here be mentioned that this unit 26 contains the pump 17, the centrifugal regulator 19 and the pressure overflow valve 20, described under reference to FIG. 6. The hydraulic pump assembly may be mounted in a cover to a hydraulic reservoir (21 in FIG. 6) with its pump and valve unit 26 partially extending down into hydraulic oil.

The electric motor 16 may preferably be a DC brush motor. By the provision of the pressure overflow valve 20, creating an overflow of excess oil back into the reservoir, the motor 16 may be constantly running, so that its brushes will not burn. The motor 16 will hereby have a very short reaction time to build up pressure in the system when needed, as it is already running, and thus less energy will be spent for accelerating rotating parts.

The drive shaft 18 of the electric motor 16 extends with its end into a piston drum 30 of an axial piston pump. The piston drum 30 is rotatably arranged in a pump housing 31. The drive shaft 18 is drivingly connected to the piston drum by means of a driver, which may allow certain relative movements.

The piston drum 30 bears against a pump lid 33 attached to the pump housing 31.

An inclined swash plate 34 (in the form of an axial ball bearing) is arranged in the pump housing 31. Axial pistons 35 (in the shown embodiment six pistons) are axially movably arranged in corresponding axial bores or cylinders in the piston drum 30 and are biased into engagement with the swash plate 34 by individual compression springs 36. At the rotation of the piston drum 30 by means of the drive shaft 18 the axial pistons 35 will be imparted a pumping, reciprocating movement in the piston drum 30 by the swash plate 34.

Figure 8:
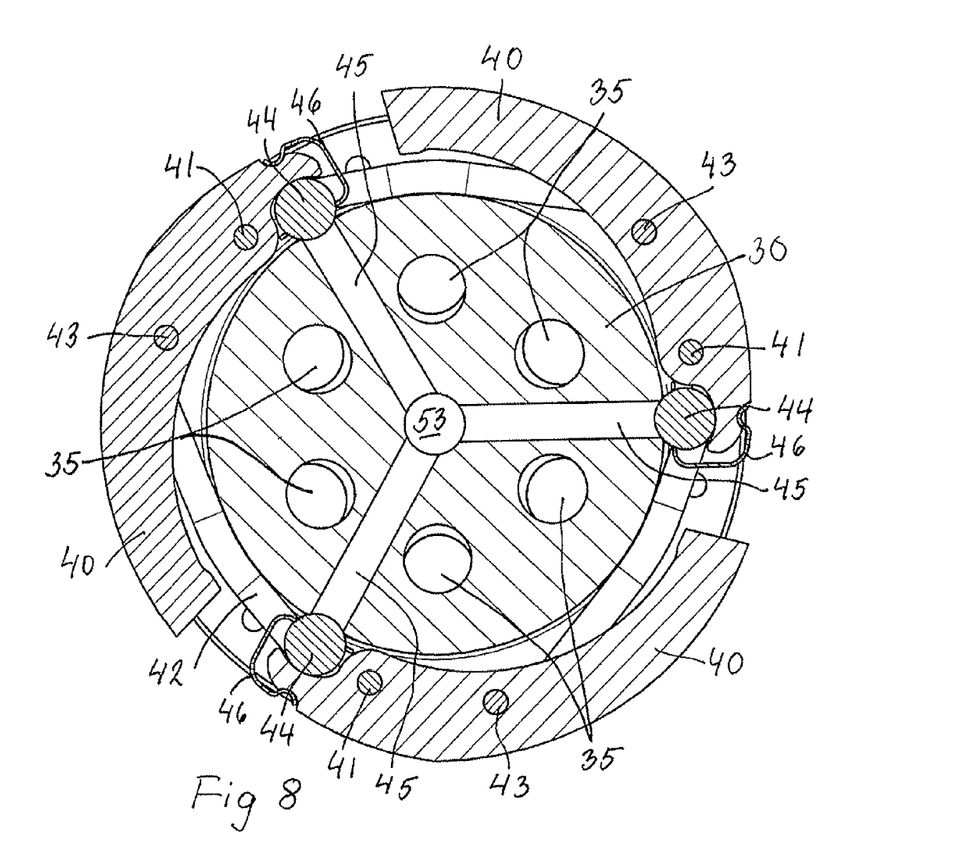
FIG. 8 is a cross-sectional view to a larger scale along the line A-A in FIG. 7.

The centrifugal regulator 19 with the pressure overflow valve 20, shown in FIG. 6, is integrally connected to the piston drum 30. Referring now mainly to FIG. 8, the regulator 19 may include at least one three centrifugal levers 40, and in one embodiment, the regulator 19 may include three centrifugal levelers 40. Each such lever 40 is relatively close to a first one of its ends pivotally attached to the piston drum 30 by means of a lever pin 41. At rotation of the piston drum 30 the other or second end of each lever 40 will be biased out from the piston drum 30 by the centrifugal force. This tendency is counteracted by a spring means in the form of a ring spring 42, laid around spring pins 43 on the levers 40.

Figure 9:
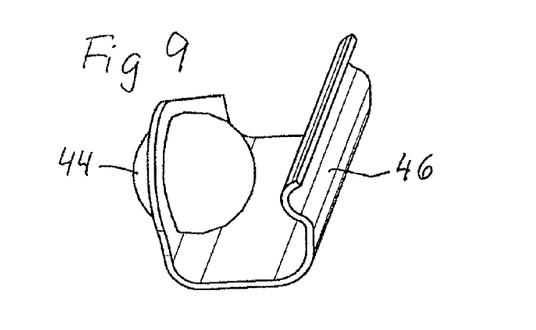
FIG. 9 is an isometric view to an even larger scale of detail parts of the assembly shown in FIGS. 7 and 8.

At said first end each lever 40 is provided with a valve member in the form of a ball 44 for cooperation with the open end of a radial bore 45 in the piston drum 30. The ball 44 is connected to the lever end by means of a spring clip 46, which is shown in FIG. 9 and will allow the ball 44 to fit sealingly in the bore end or mouth of the bore with certain position adjustments.

In FIG. 8, the levers 40 are shown swung out under the action of a centrifugal force, and the balls 44 are closing off the radial bores 45.

In a normal operational condition with the motor 16 running at a constant speed, the balls 44 will attain a stabile semi-open position in relation to the bores 45.

The hydraulic oil is transported within the pump and valve unit 26 as follows:

Oil is sucked in from the reservoir 21 through an axial inlet bore 50 in the pump lid 33. The inlet bore 50 opens into a circumferential, shallow slot in the pump lid surface facing the pump drum 30, so that oil can enter each cylinder containing a piston 35 in the pump drum 30 during rotation of the latter.

Oil pressurized by the piston 35 is then delivered through another circumferential, shallow slot in said pump lid surface diametrically opposite the first slot opening into a radial bore 51 in the pump lid 33 and further into an outlet channel 52 in the pump housing 31, the outlet channel being in contact with the hydraulic line 23 leading to the cylinder 14 (FIG. 6).

The radial bore 51 is also in contact with a central blind bore 53, from which the radial bores 45 extend outwardly towards the balls 44. Finally, from a circumferential space 54 in the pump housing 31 surrounding the piston drum 30 and the levers 40 of the centrifugal regulator 19 there is an axial bore 55 in the pump lid 51 for delivery back of excess oil from the pressure overflow valve 20 constituted by the spring biased balls 44.

As stated earlier, the DC motor 16 is always running, when the vehicle is in operation. Under normal operation conditions, when there is no need to have the limited slip coupling 7 engaged, the motor is running at a rotational speed below that at which the pressure overflow valve 20 closes. When there is a demand for engaging the coupling 7, i e for actuating the piston 13, a high current/voltage is supplied to the DC motor 16. The speed of the drive shaft 18 will go up, whereby the overflow valve 20 will be closed by the centrifugal regulator 19, i e the levers 40 will swing out, pressing the balls 44 sealingly against the ends of the radial bores 45. Conversely, if the rotational speed of the motor drive shaft 18 is lowered, the centrifugal force on the levers 40 will decrease, enabling the ring spring 42 to return the levers 40 against the pump drum 30, so that the balls 44 are lifted, opening the radial bores 45.

The function of the relief valve 25 is to control the maximum pressure in the system, to enable a calibration of the system at any time and to get rid of air in the system in connection with the assembly and also in connection with the starting of the vehicle engine.

Figure 10:
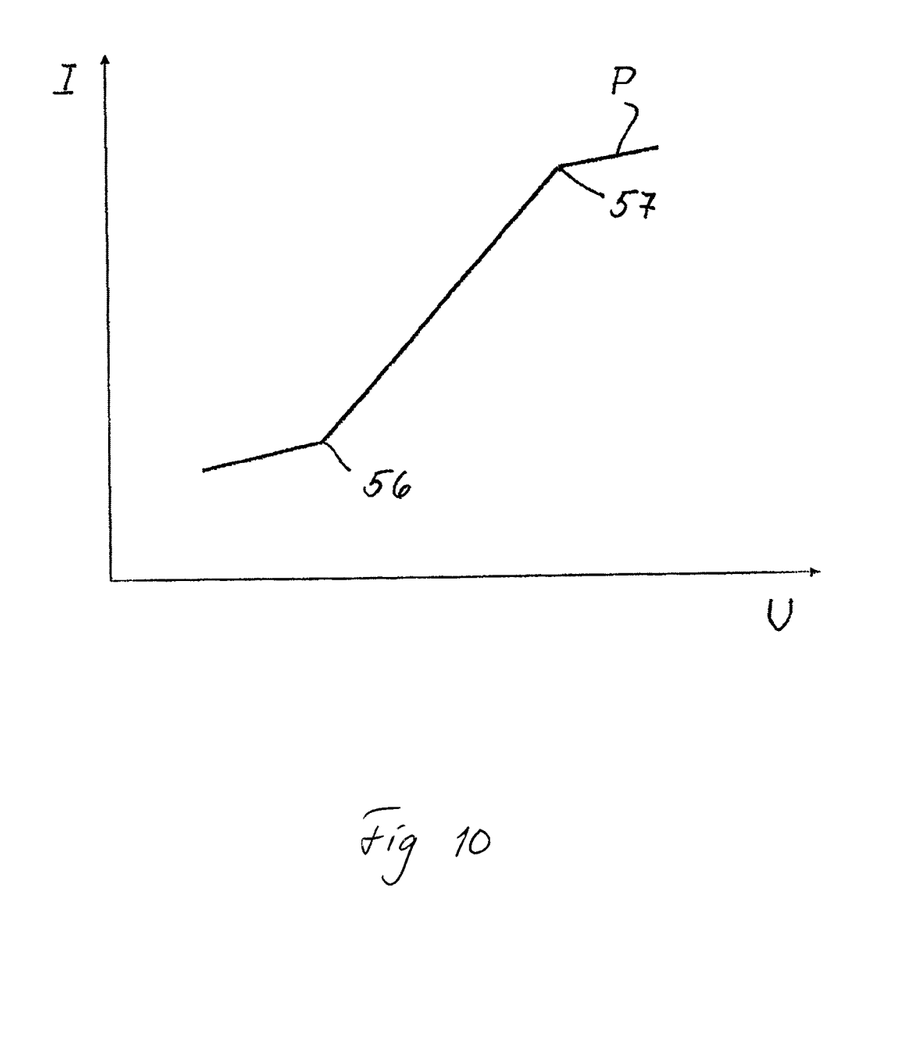
FIG. 10 is an I/U graph for an electric motor in the assembly.

FIG. 10 is a graph showing the relationship between the current I and the voltage U for the motor 16 at the building-up of hydraulic pressure P from the hydraulic pump assembly. In essence, the pressure level is governed by the current I. In a certain temperature interval the current is in principle proportional to the pressure. Every manufactured hydraulic pump assembly has an individual constant between pressure and current, and it is therefore normal practice to make a calibration of each pump assembly at the end of the manufacturing process.

However, this constant normally undergoes changes, for example due to smoothening of surfaces of different parts at operation of the pump assembly, and it may therefore be advantageous to provide means to renew the calibration at intervals, for example every time the engine of the vehicle is started by means of the ignition key.

Two reference points or elbows can be identified and used for this calibration:

A first point 56, when the centrifugal levers 40 overcome the force of the ring spring 42 and close the valves, constituted by the balls 44 seating against the radial bores 45. The pressure rises over a ground pressure depending on hydraulic losses in pipes also at open valves.

A second point 57, when the mechanical relief valve 25 opens, so that the pressure cannot be further increased by the pump assembly.

In both cases the relation between voltage U and current I is used. By running the function $I=f(U)$, the two elbows or calibration points can be identified and used.

Modifications are possible within the scope of the appended claims.

The invention claimed is:

1. A hydraulic pump assembly in a system for distributing torque between at least one of front and rear axles of an all wheel drive vehicle or between left and right wheels of a two or four wheel drive vehicle, the system comprising at least one limited slip coupling having a disc package and a piston acting thereon, the piston being actuated by the hydraulic pump assembly,
wherein the hydraulic pump assembly comprises an electric motor, a hydraulic pump driven thereby, and a centrifugal regulator also driven thereby, the centrifugal regulator controlling a pressure overflow valve, connected to the oil outlet of the hydraulic pump,
wherein the hydraulic pump assembly comprises
an axial piston pump having a piston drum rotatable in a pump housing and containing a number of reciprocable axial pistons,
at least one centrifugal lever pivotally attached to the piston drum, and
a valve member connected to the centrifugal lever and being arranged for cooperation with a mouth of an oil outlet bore in the piston drum to form the pressure overflow valve.

2. An assembly as set forth in claim 1, wherein the hydraulic pump assembly includes a plurality of centrifugal levers evenly distributed around the piston drum, each lever being provided with a ball for engagement with a bore in the piston drum under the action of centrifugal force.

3. An assembly as set forth in claim 2, further comprising a spring means for biasing the centrifugal levers in the direction opposite the centrifugal force.

4. An assembly as set forth in claim 3, wherein the spring means comprises a ring spring arranged around the piston drum and the centrifugal levers.

5. An assembly as set forth in claim 2, wherein the ball is connected to an associated centrifugal lever by means of a spring clip allowing certain position adjustments for the ball in relation to the bore.

6. An assembly as set forth in claim 1, further comprising a means for calibrating the assembly occasionally during operation by utilizing the current as a function of voltage.

7. A torque distribution system of a vehicle, said system comprising an assembly as set forth in claim 1.

8. A hydraulic assembly as set forth in claim 2 wherein the plurality of centrifugal levers comprises at least three centrifugal levers.

9. A hydraulic assembly as set forth in claim 2 wherein at least one of the plurality of centrifugal levers is constructed and arranged to have a first end closest to a pivotal connection to the piston drum and having a second end furthest from the pivotal connection to the piston drum, and so under the application of centrifugal force the second end of the at least one of the plurality of centrifugal levers is biased out from the piston drum and the first end of the at least one of the plurality of centrifugal levers biases the ball into engagement with the bore of the piston drum.

* * * * *